Oct. 18, 1960     G. E. WRIGHT     2,956,326

MULTIPLE STAGE MOLDING MACHINE

Filed July 5, 1955     4 Sheets-Sheet 1

INVENTOR.
GEORGE E. WRIGHT
BY
Knox & Knox

Oct. 18, 1960 G. E. WRIGHT 2,956,326
MULTIPLE STAGE MOLDING MACHINE
Filed July 5, 1955 4 Sheets-Sheet 2

INVENTOR.
GEORGE E. WRIGHT
BY
Knox & Knox

Oct. 18, 1960 G. E. WRIGHT 2,956,326
MULTIPLE STAGE MOLDING MACHINE

Filed July 5, 1955 4 Sheets-Sheet 3

INVENTOR.
GEORGE E. WRIGHT
BY
Knox & Knox

INVENTOR.
GEORGE E. WRIGHT
BY
Knox & Knox

United States Patent Office 2,956,326
Patented Oct. 18, 1960

2,956,326

MULTIPLE STAGE MOLDING MACHINE

George E. Wright, Cardiff-by-the-Sea, Calif.

Filed July 5, 1955, Ser. No. 519,981

1 Claim. (Cl. 25—100)

The present invention relates generally to molding machines and more particularly to a multiple stage molding machine for making building blocks and the like.

The primary object of this invention is to provide a molding machine which will automatically and continuously produce molded articles such as bricks, block, or the like of various sizes from concrete or other moldable material.

Another object of this invention is to provide a molding machine in which a plurality of separate, interchangeable molds are advanced collectively around a closed track at one stroke of the machine and some of the molds are automatically charged while other molds are simultaneously discharged during another stroke of the machine.

Another object of this invention is to provide a molding machine which is adapted for fabrication from many different materials, so that the choice of material can be according to the dictates of availability and price considerations, the exact sizes and proportions being matters easily determined to suit particular conditions and needs.

Another object of this invention is to provide a molding machine which is practicable and inexpensive to manufacture.

Another object of this invention is to provide a molding machine having a discharge station with improved means for lifting the inverted molds individually leaving the molded articles undisturbed and undamage on pallets which are advanced together with the molds, means being provided to hold the molded articles down on the pallets so that the articles are not dropped when the molds are raised.

Finally, it is an object to provide a molding machine of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claim, and illustrated in the drawings which form a material part of this disclosure and wherein similar characters of reference indicate similar or identical elements and portions throughout the specification and throughout the views of the drawings, and in which:

Figure 1:
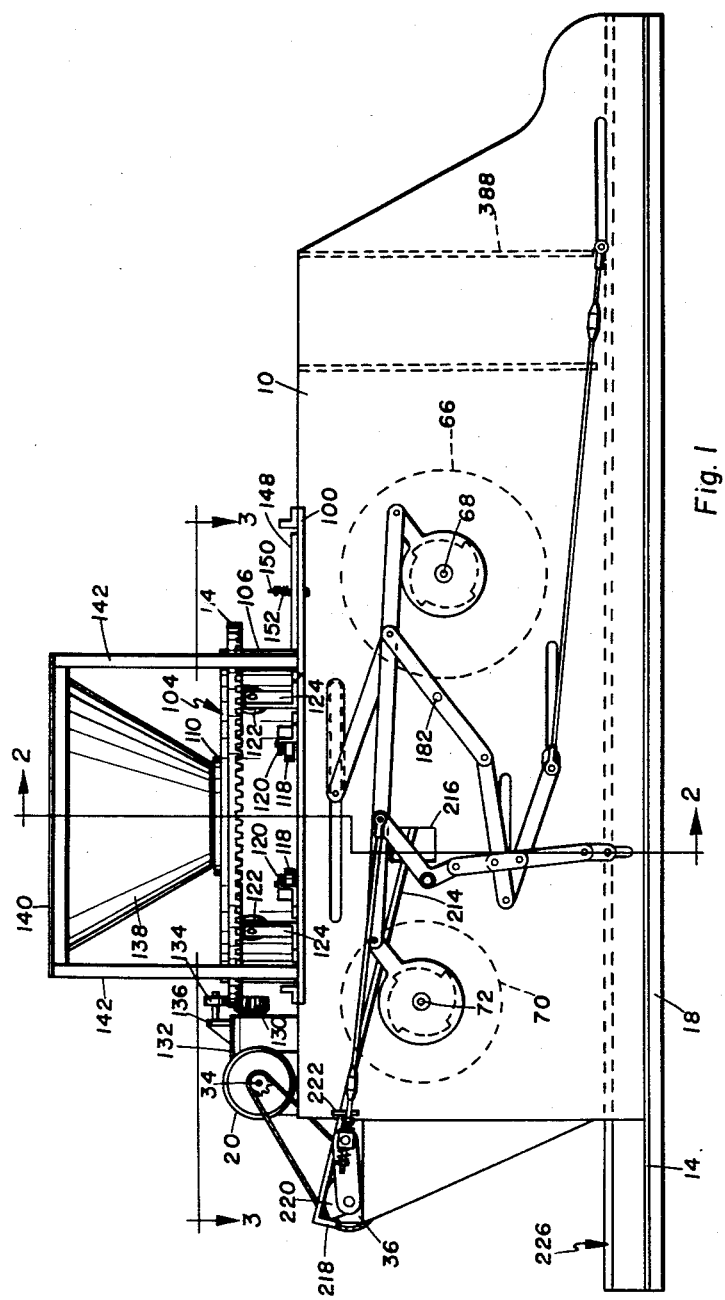
Fig. 1 is a side elevation view of the machine.

The basic structure of the machine, including the molds, mold tracks, mold advancing mechanism and the pallet feed mechanism are similar to that shown and described in my copending application Serial No. 316,896, filed October 25, 1952, now Patent No. 2,713,709. However, the structure of the instant machine will be described in sufficient detail in this disclosure to disclose the new structure and complete operation of the machine.

The basic frame of the machine comprises a pair of vertical sides 10 and 12 secured to a base plate 14 and reinforced by channel members 16, the base plate being supported on base members 18. The machine is powered by a motor 20 mounted on a platform 24 which is fixed to the upper edges of the sides 10 and 12 at one end. At the same end of the machine is a transverse main drive shaft 34 journalled in bearing blocks 36, said shaft being driven directly from the motor 20.

The molds 42 are moved in a closed path formed by an upper track 44, a lower track 46, a curved end track 48 joining said upper and lower tracks at the end remote from the motor 20, and a further curved end track 50 which interconnects the other end of the upper track 44 with the raised portion 52 of the lower track 46. The tracks are, of course, secured to both of the sides 10 and 12 in opposed relation. The inner portions of the end tracks 48 are formed by the peripheries of a pair of wheels 66 mounted on a cross shaft 68, while the inner portions of the end tracks 50 are similarly formed by a pair of wheels 70 mounted on a cross shaft 72.

Each mold 42 has a pair of laterally extending trunnions 80 which ride in the tracks and guide the mold. The molds are advanced around the tracks by a reciprocating ratchet mechanism having pawls which engage the trunnions 80, the wheels 66 and 70 also having tongue elements to carry the molds around the curved end tracks. The entire mechanism is actuated by an interconnected linkage mechanism driven from the shaft 34, as fully described in my previously mentioned copending application.

Figure 2:
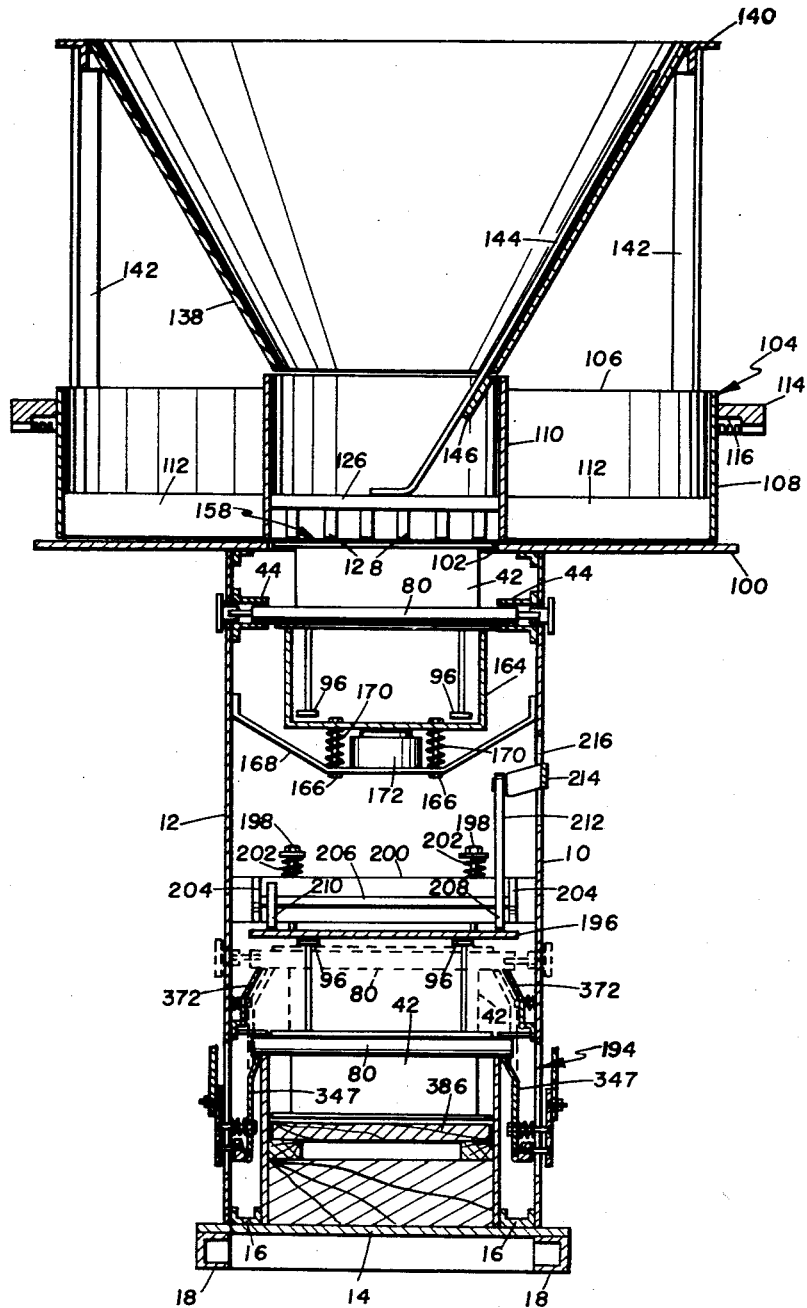
Fig. 2 is an enlarged sectional view taken on the line 2—2 of Fig. 1.
Figure 3:
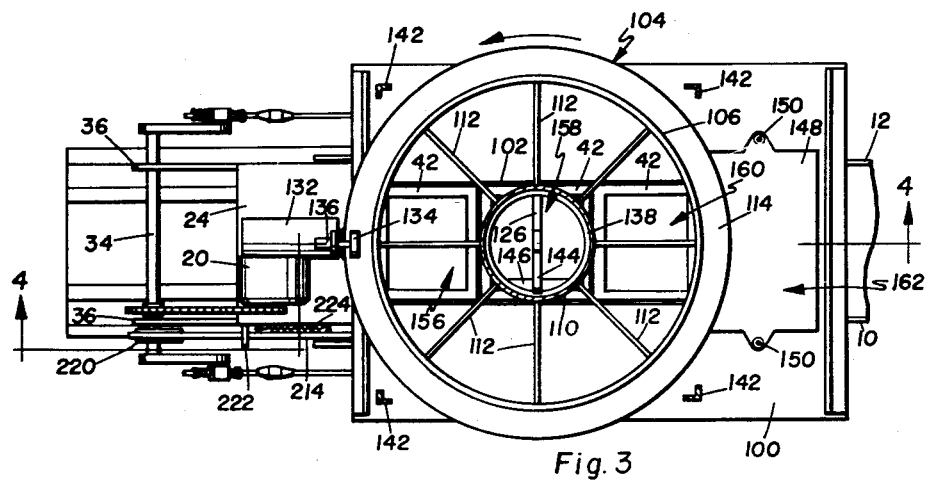
Fig. 3 is a partial top plan view of the machine.
Figure 5:
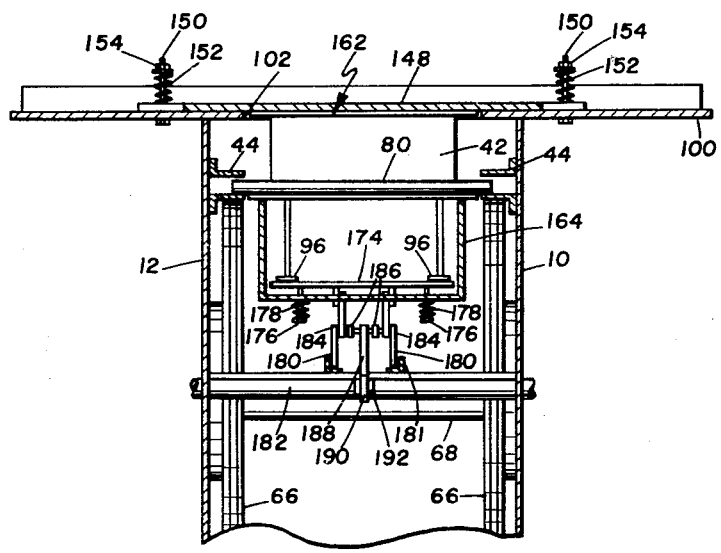
Fig. 5 is a fragmentary sectional view taken on the line 5—5 of Fig. 4.

Fixed across the top of the sides 10 and 12 is a large upper platform 100 having a longitudinal slot 102 to expose the molds 42 in the upper track 44, the uppermost surfaces of the molds being substantially flush with the upper surface of said platform as shown in Figs. 2 and 5. The platform 100 is braced in any suitable manner for maximum rigidity. Mounted on top of the platform 100 is a distributor assembly 104 which is rotatable about a vertical axis. The distributor assembly 104 comprises a cylindrical outer drum 106 having an upright wall 108 and a smaller, cylindrical inner drum 110 concentric with the outer drum, said inner drum 110 being supported by a plurality of radial distributor blades 112 extending between it and the outer drum 106, as shown in Fig. 3. Fixed to the outside of the outer drum 106, adjacent its upper edge, is a ring gear 114 having an annular channel 116 in its lower surface. The outer drum 106 is centered between guide rollers 118 mounted in brackets 120 for rotation about vertical axes, said brackets being fixed to the platform 100. The distributor assembly 104 is supported on further rollers 122 mounted on brackets 124 and rotatable about horizontal axes, said rollers riding in the channel 116. Extending diametrically across the inner drum 110 adjacent its lower end is a fixed comb bar 126 to which are secured a plurality of depending teeth 128, the lower ends of said teeth being closely spaced from the upper surface of the platform 100, as shown in Fig. 2. The distributor assembly 104 is driven by a gear 130 which is driven by the motor 20 through a suitable gear box 132, said gear meshing with the ring gear 114. The ring gear 114 is held in engagement with the gear 130 by a retaining roller 134 bearing on the upper surface of said ring gear, said roller being rotatably mounted on a bracket 136 fixed on the gear box 132.

Above the distributor assembly 104 is a frusto-conical hopper 138 having its lower end concentric with and adjacent the upper end of the inner drum 110, said hopper being secured in a frame 140 fixed to the upper end of the hopper and supported above the platform 100 by corner posts 142. Secured to the comb bar 126 is an upwardly sloping scraper bar 144 which rotates with the inner drum 110 and slides in frictional contact around the inner surface of the hopper 138, said scraper bar being braced at the upper end of said inner drum by a crossplate 146, as in Fig. 2.

The slot 102 in the platform 100 extends longitudinally of the machine and diametrically across the distributor assembly 104, and extends beyond said assembly on the side remote from the motor 20. This extended portion of the slot 102 is covered by a pressure plate 148 which is held tightly down on the platform 100 by a pair of bolts 150 having heavy compression springs 152 thereon. The bolts 150 are provided with nuts 154 so that the pressure of the springs 152 can be adjusted.

Figure 4:
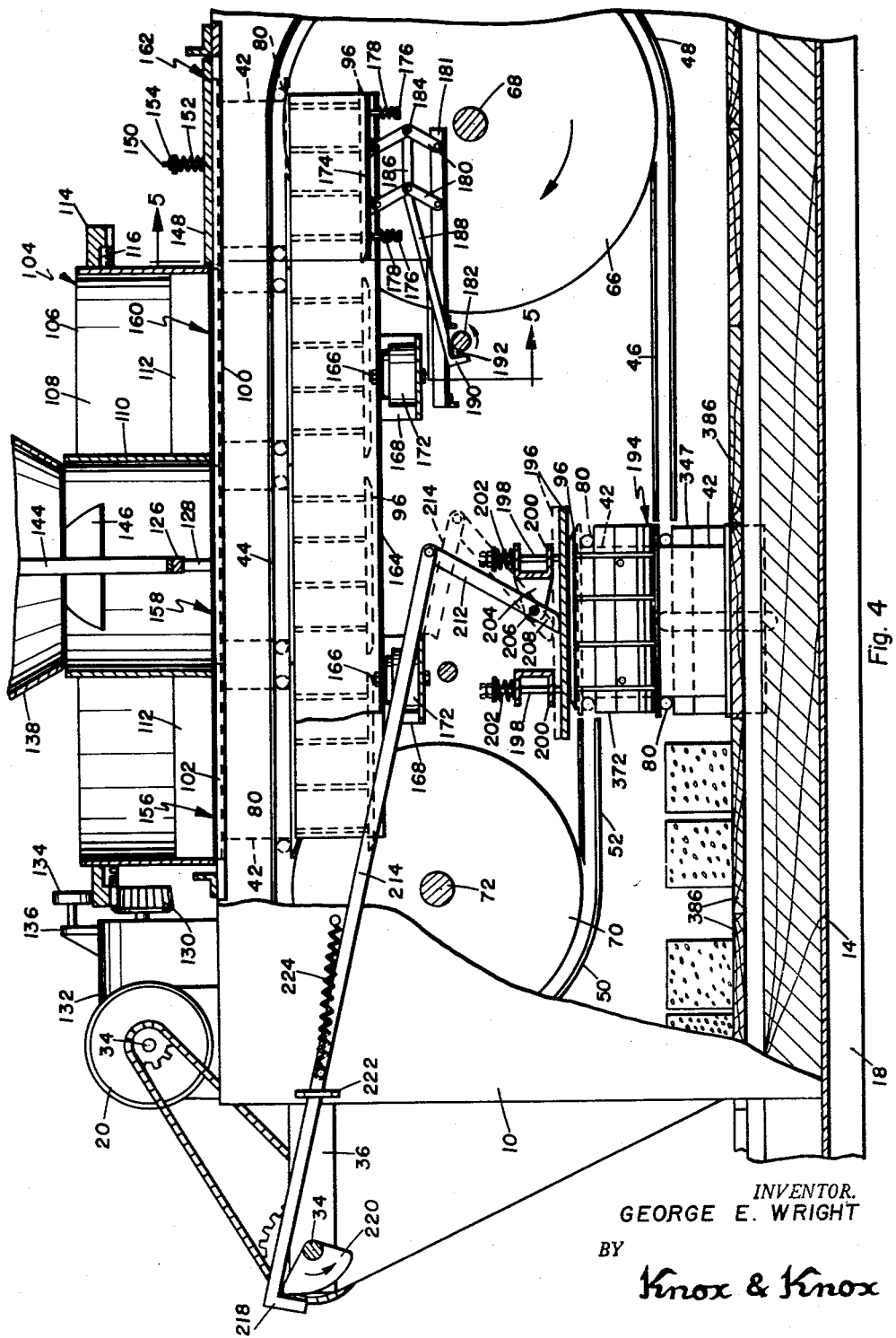
Fig. 4 is an enlarged sectional view taken on the line 4—4 of Fig. 3.

With reference to Fig. 4, it will be seen that four molds 42, shown in dash line, are simultaneously positioned beneath the platform 100 in the slot 102. These molds are positioned at four definite stations which include, in succession, a preliminary filling station 156 adjacent the motor 20, a main filling station 158 directly beneath the inner drum 110, a screed station 160 and a press station 162, the latter being beneath the pressure plate 148. Extending the full length of the four stations 156–162 is a vibrator trough 164, the upper edges of which are in contact with the lower faces of the molds 42, as in Fig. 2. The vibrator trough 164 is mounted on guide pins 166 which are vertically slidable in support brackets 168 extending between the sides 10 and 12, said trough being biased upwardly by springs 170 concentric with said guide pins. The vibrator trough 164 is actuated by vibrator elements such as the electromagnetic type elements 172 operatively mounted on the support brackets 168 although mechanical or other vibrators may be used with equal effectiveness. Thus when the vibrator elements 172 are in operation, all the molds in the upper track 44 are vibrated.

Within the vibrator trough 164 at the press station 162 is a push plate 174 mounted on guide pins 176 for vertical movement and biased downwardly to lie flat in the bottom of the trough by springs 178 fitted on said guide pins. Pivotally attached to the lower surface of the push plate 174 are longitudinally spaced toggle bars 180, the lower ends of which are pivotally attached to a fixed support frame 181 suitably mounted between the sides 10 and 12. The toggle bars 180 have central pivot joints 184 and are interconnected at those joints by a coupling bar 186. Extending from the coupling bar 186 is an actuating rod 188 having a hook portion 190 at its free end. This hook portion 190 is engaged by a cam 192 carried on a rock shaft 182 which is a part of the mold circulating mechanism as described in my previously mentioned copending application. This rockshaft 182 has an oscillating rotary motion so that the cam 192 rocks back and forth over the top of the shaft, thus intermittently pulling the actuating bar 188 and causing the toggle bars 180 to force the push plate 174 upwardly. When the actuating bar 188 is released, the springs 178 pull the push plate 174 down again.

At the broken portion of the lower track 46 is a discharge station 194 at which each mold is individually lifted to eject the molded articles therefrom. Directly above this discharge station 194 is an ejection plate 196 mounted on guide pins 198 which are vertically slidable in fixed cross members 200 secured between the sides 10 and 12. The ejection plate 196 is biased upwardly by springs 202 mounted on the guide pins 198 as in Fig. 4. Fixed to one of the cross members 200 is a bracket 204 on which is pivotally mounted a shaft 206 carrying a pair of actuating arms 208 and 210 which bear on the upper surface of the ejection plate 196. The actuating arm 208 has an upwardly extending lever portion 212, to the end of which is pivotally attached a pull bar 214, said pull bar extending outwardly through an opening 216 in the side 10 and along the side of the machine to the shaft 34. The end of the pull bar 214 has a hook portion 218 which is engaged by a cam 220 fixed on the shaft 34, said pull bar being slidably held in a suitable guide 222 fixed to the side 10. The pull bar 214 is pulled by the cam 220 as the shaft 34 rotates, so pulling the lever portion 212 and causing the actuating arms 208 and 210 to force the ejection plate 196 downwardly. The pull bar 214 is biased to return, when released by the cam 220, by a return spring 224 terminally secured to said pull bar and to the side 10, the returned position being shown in dash line in Fig. 4. The operation of the machine will now be described:

At one stroke of the mechanism all molds are advanced one position without any other action taking place. At the second or return stroke of the mechanism all the molds remain stationary while the filling, pressing and discharge operations takes place. The moldable material, such as concrete, is fed into the hopper 138 and enters the inner drum 110 which rotates continuously with the distributor assembly 104. For convenience of description the moldable material will hereinafter be referred to as mud, which is a common term in the art. The mud falls into the mold 42 immediately below the main filling station 158 and is agitated by the comb teeth 128 so that the mold is completely filled. As the mold advances on the next advance stroke of the machine, the mud is scraped off the top of the mold by the lower edge of the inner drum 110. However, the levelling of the mud is not perfect and a certain amount of excess is carried through to the screed station 160 where the rotating distributor blades 112 complete the levelling. The excess mud is carried around by the distributor blades 112 and is dumped into the mold at the preliminary filling station 156, thus preventing pile-up and wastage of mud. At the next advance stroke, the filled and screeded mold is brought to the press station 162. At this position, the push plate 174 is forced upwardly by the action of the toggle bars 180 as explained above. This upward movement is but a fraction of an inch and serves to lift the ejector bars 96 of the mold 42, so compressing the mud in the mold against the pressure plate 148. The pressing action compacts the mud and removes excess water and, in the case of building blocks, reduces the height of the molded blocks by a slight amount to allow for the thickness of the mortar layer used in building structures. The springs 152 are normally adjusted to hold the pressure plate 148 in place during the press action. However, if the pressure is excessive, such as when a rock or other foreign object enters the mold and resists compression, the pressure plate 148 lifts slightly to prevent overload and damage to the machine. This lifting of the pressure plate 148 provides visual indication of overload to the operator so that the plate serves a dual purpose. It will be obvious, of course, that the operations at the four stations 156–162 take place simultaneously.

From the upper track 46, the molds advance around the end track 48 to the lower track 46 and thence to the discharge station 194. At the discharge station 194, the trunnions 80 of each mold are engaged by the upper edges of lifting plates 347, and the mold is lifted until the trunnions are caught and retained on sprung track plates 372 which are aligned with the raised track portion 52. This mechanism and its operation is also fully described in my previously mentioned copending application. The cam 220 is timed so that immediately prior to the lifting action at the discharge station 194, the ejection plate 196 is forced downwardly for a limited distance to bear on the ejection bars 96 of the mold 42. This ensures that the molded articles are held down onto a pallet 386 positioned below the mold before the mold is actually lifted. Thus the molded articles remain stationary while the mold itself is lifted clear as shown in dash line in Fig. 4. This is important since the lack of movement of the still unset molded articles prevents damage and distortion. The cam 220 is also timed so just before the completion of the mold lifting action, the pull bar 214 is released, allowing the ejection plate 196 to snap upwardly under the influence of the springs 202 and release the mold completely from the molded articles. By this release action the mold 42 is left free for advancement to the raised track portion 52 at the next advance stroke, the empty mold then being carried around the end track 50 to be refilled.

The pallets 386 are stored in a magazine 388 and are advanced together with the molds by the mechanism described in my previously mentioned copending application. The pallets with the molded articles thereon are advanced to an unloading station 226 from which they can be removed and stacked for setting.

The machine has a very high production capacity since the various filling, compacting and discharging operations are carried out simultaneously. The molded articles are held firmly on a pallet during ejection to prevent damage and the articles are consequently accurate in form and of high quality. The molds may be interchanged and even mixed to produce different articles, the actual size and shape of the articles having no effect on the operation of the machine. Since all mechanisms of the machine are synchronized, the likelihood of jamming or malfunction is remote, and it has been found that the machine may be operated smoothly and continuously for extended periods.

Similar characters of reference indicate similar or identical elements and portions throughout the specification and throughout the views of the drawing.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

In a molding machine a plurality of molds, a mold carrying upper track, an interrupted lower track having a raised portion, and curved end tracks interconnecting the ends of said upper track with one end of the lower track and with the opposite end of said raised portion; power means for advancing said molds intermittently along said tracks the interrupted portion of said lower track comprising a discharge station; a lifting mechanism at said discharge station to lift said molds successively from said lower track to the level of said raised portion; said molds each having ejection bars positioned to extend upwardly when the molds are inverted; an ejection plate mounted above said discharge station for vertical movement; actuating means connected to said power means to lower said ejection plate into contact with said ejection bars immediately prior to the mold lifting action, so that the molded articles in the mold are held stationary on the lower track when the mold is lifted; biasing means urging said ejection plate to move upwardly; said actuating means being connected and timed to release said ejection plate so that said biasing means lifts said ejection plate clear of said ejection bars at the completion of the mold lifting stroke.

References Cited in the file of this patent

UNITED STATES PATENTS

| | | |
|---|---|---|
| 482,252 | Jacobs | Sept. 6, 1892 |
| 1,029,559 | Pauly | June 11, 1912 |
| 1,029,560 | Pauly | June 11, 1912 |
| 1,280,575 | Stehm | Oct. 1, 1918 |
| 1,293,932 | Robinson | Feb. 11, 1919 |
| 1,550,014 | Dubuy | Aug. 18, 1925 |
| 1,929,301 | Batcheller | Oct. 3, 1933 |
| 2,402,368 | Cantrall | June 18, 1946 |
| 2,545,366 | Mandryl | Mar. 13, 1951 |
| 2,593,665 | Glassen | Apr. 22, 1952 |
| 2,713,709 | Wright | July 26, 1955 |
| 2,787,041 | Pettipiece | Apr. 2, 1957 |

FOREIGN PATENTS

| | | |
|---|---|---|
| 474,950 | France | Mar. 26, 1915 |